United States Patent
Tseng et al.

(10) Patent No.: US 7,395,462 B2
(45) Date of Patent: Jul. 1, 2008

(54) DEFECT ESTIMATION APPARATUS AND RELATED METHOD

(75) Inventors: Wei-Hsiang Tseng, Taipei (TW);
Hsin-Cheng Chen, Tainan Hsien (TW);
Ping-Sheng Chen, Chia-Yi Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 423 days.

(21) Appl. No.: 11/306,360

(22) Filed: Dec. 25, 2005

(65) Prior Publication Data

US 2007/0150212 A1 Jun. 28, 2007

(51) Int. Cl.
*G06F 11/00* (2006.01)

(52) U.S. Cl. .......... 714/704; 714/752; 714/42; 714/6; 714/8; 714/48; 714/769; 714/746; 714/805; 714/31; 714/25; 714/705; 369/53.17; 369/44.32; 369/53.15; 369/59.22; 369/44.25; 702/35; 711/112; 711/105

(58) Field of Classification Search ........... None
See application file for complete search history.

(56) References Cited

U.S. PATENT DOCUMENTS

| | | | | |
|---|---|---|---|---|
| 5,621,743 A | * | 4/1997 | Tomisawa | 714/746 |
| 6,061,760 A | * | 5/2000 | Huang | 711/112 |
| 6,986,095 B2 | * | 1/2006 | Maeda et al. | 714/769 |
| 7,032,127 B1 | * | 4/2006 | Egan et al. | 714/8 |
| 7,349,296 B2 | * | 3/2008 | Akkermans et al. | 369/44.25 |
| 2001/0026508 A1 | * | 10/2001 | Sasaki et al. | 369/44.32 |
| 2004/0130982 A1 | * | 7/2004 | Lee et al. | 369/44.32 |

* cited by examiner

*Primary Examiner*—John P Trimmings
(74) *Attorney, Agent, or Firm*—Winston Hsu (57) ABSTRACT

A weighted defect estimating apparatus and a related method for determining a defect estimation value are disclosed. The weighted defect detecting apparatus includes: a defect detecting unit for generating a defect value when a defect in a predetermined region of an optical disc is detected; a weighting circuit, electrically connected to the defect detecting unit, to generate a weighted defect value according to the defect value and a weighting factor corresponding to a location of the defect on the optical disc; and a computing module, electrically connected to the weighting circuit, for computing the defect estimation value according to a plurality of weighted defect values corresponding to the predetermined region.

21 Claims, 8 Drawing Sheets

DEFECT ESTIMATION APPARATUS AND RELATED METHOD

BACKGROUND

The invention relates to an apparatus applied in an optical disc drive and a related method, and more particularly, to a defect estimating apparatus and a related method.

For several years, optical disc drives have been considered standard equipment for personal computers. Generally, optical disc drives are utilized for recording information onto optical discs and for reading information stored on the optical discs or both. In some examples of related art, optical disc drives are designed to read or write data upon different kinds of optical discs, such as compact disc (CD) and digital versatile disc (DVD). In addition, except for some write once optical disc e.g. CD-R and DVD-R, the optical disc drives are capable of rewriting data onto certain optical discs e.g. CD-RW and DVD-RW.

Figure 1:
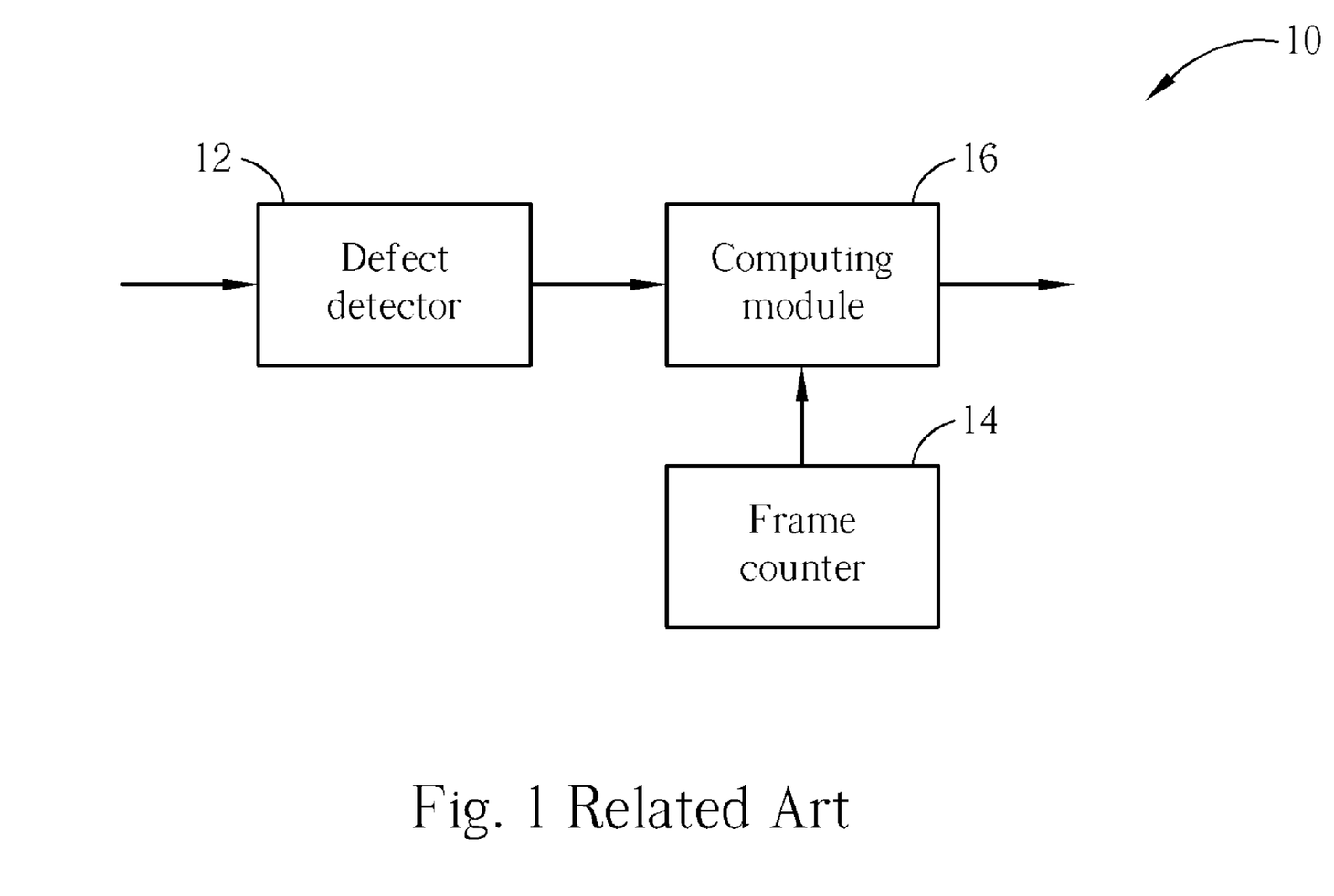
FIG. 1 is a schematic diagram of a defect estimating apparatus of related art applied in an optical disc drive.

When an optical disc drive is recording information onto a defect area of an optical disc, the information recorded onto the defect area cannot be read back correctly. Therefore, it is necessary to detect if a defect exists on the optical disc when the information is being recorded. Please refer to FIG. 1. FIG. 1 is a schematic diagram of a related art that presents a defect estimating apparatus 10 applied in an optical disc drive. The defect estimating apparatus 10 of the related art comprises a defect detector 12, a frame counter 14, and a computing module 16. If the defect detector 12 determines that a defect exists in a predetermined region, the defect detector 12 outputs a defect value to the computing module 16. The computing module 16 accumulates the defect values as they are received in the predetermined region. Utilizing the accumulated defect values, the computing module 16 generates a defect estimation value of the predetermined region. If the defect estimation value is greater than a threshold value, the optical disc drive will skip the predetermined region in favor of recording data into another region. The frame counter 14 is utilized for counting a plurality of frames of the data to be written onto the optical disc, and for outputting a frame number to the computing module 16 accordingly. The computing module 16 is capable of determining the start and the end of the predetermined region according to the frame number transmitted from the frame counter 14 and generate defect estimation value according to the defect value from the defect detector 12. When the computing module 16 receives a frame number corresponding to the end of the predetermined region, the computing module 16 will reset the defect estimation value to zero, and then begins the process of accumulating defect values for generating a defect estimation value for the next region.

Figure 2:
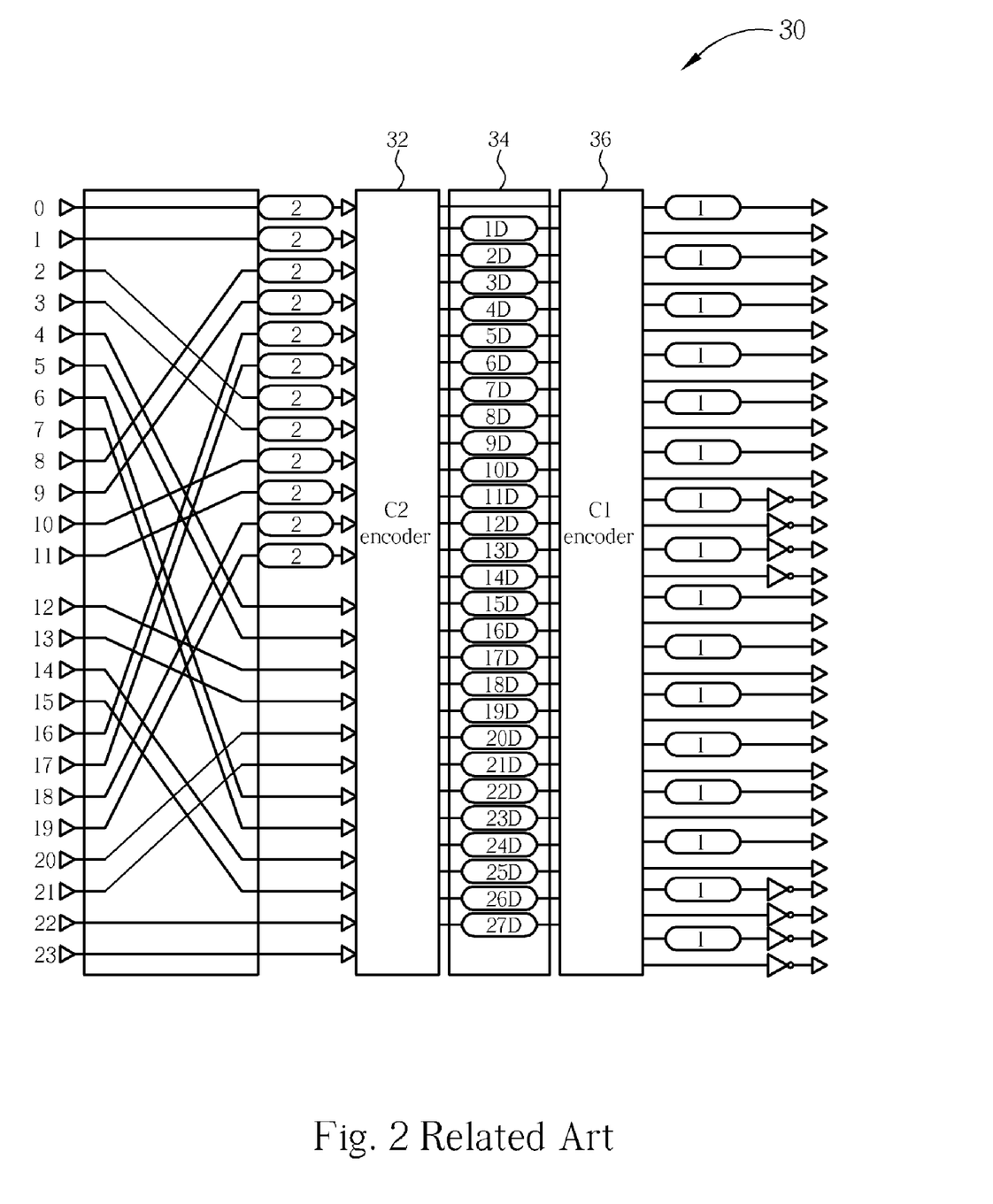
FIG. 2 is a schematic diagram of an encoder of the related art applied in a CD drive.
Figure 3:
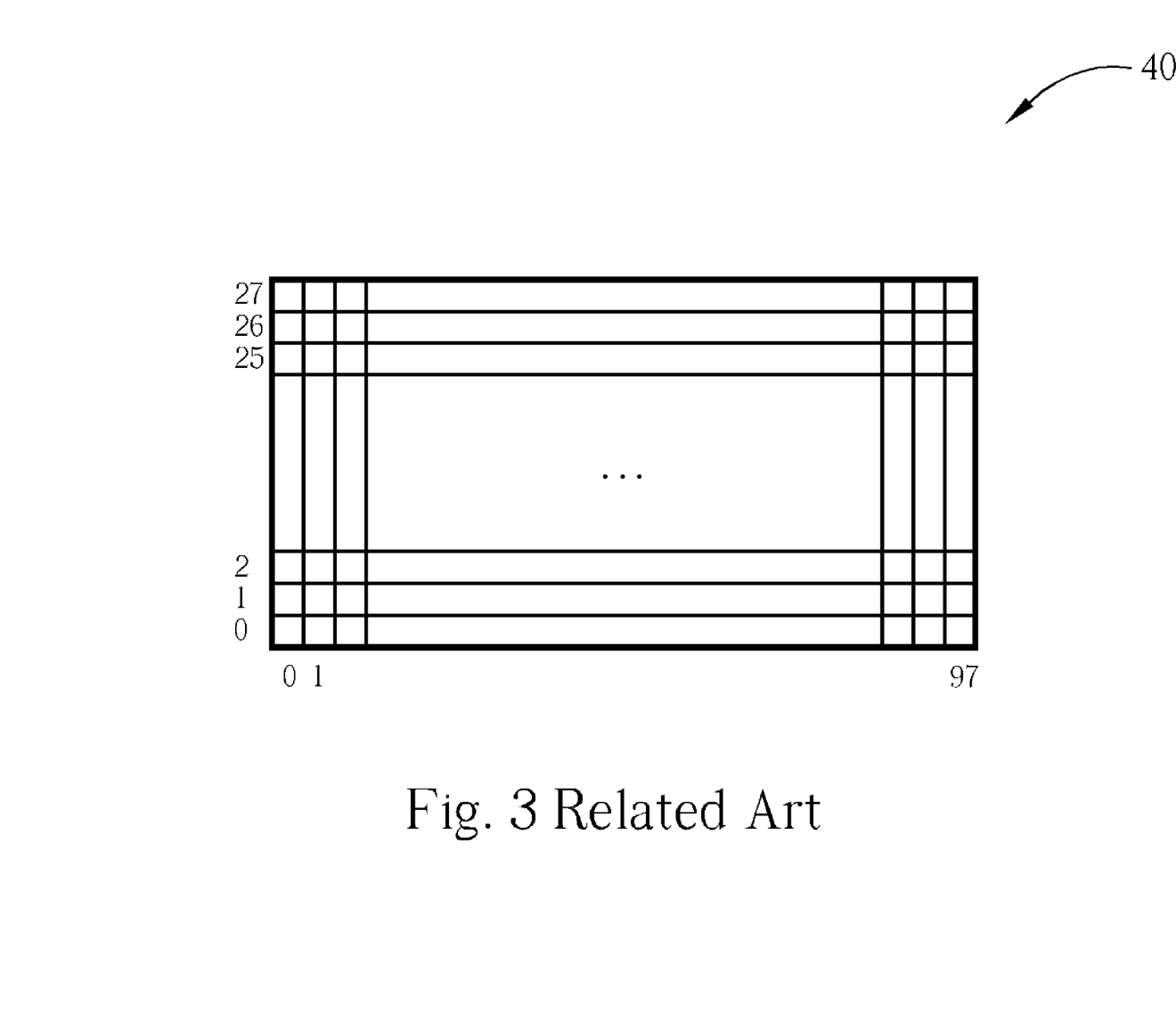
FIG. 3 is a schematic diagram of a sector outputted by the C2 encoder shown in FIG. 2.
Figure 4:
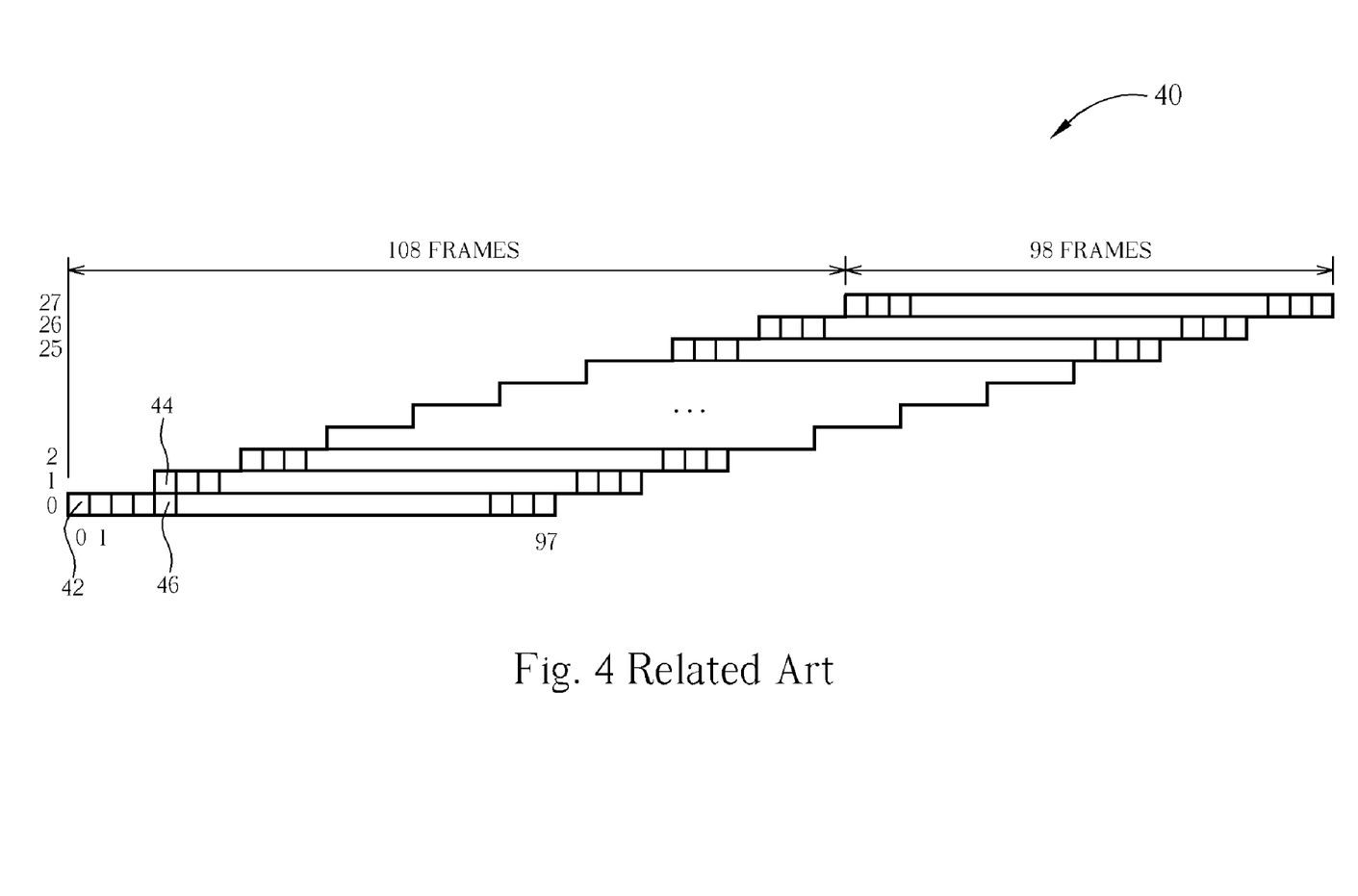
FIG. 4 is a schematic diagram of a sector received by the C1 encoder shown in FIG. 2.

Although the architecture of the defect estimating apparatus 10 of the related art is very simple, the effect of a defect may be undervalued or overvalued by the defect estimating apparatus 10 of the related art. Take the Compact Disc (CD) as an example. FIG. 2 is a schematic diagram of an encoder 30 of the related art applied in a CD drive. The encoder 30 of the related art comprises a C2 encoder 32, unequal-length delay lines 34, and a C1 encoder 36. In the beginning, twenty-four 8-bit symbols are interleaved and then transmitted to the C2 encoder 32. The C2 encoder 32 encodes the twenty-four 8-bit symbols, and then outputs twenty-eight encoded symbols. Next, the twenty-eight encoded symbols are delayed by different time intervals, such as 0, 1D, 2D, . . . , 27D, where D denotes the length of four input timings. Finally, the C1 encoder 36 encodes the received symbols, and outputs thirty-two encoded symbols. Please refer to FIG. 3 and FIG. 4. FIG. 3 is a schematic diagram of a sector 40 outputted by the C2 encoder 32 shown in FIG. 2. FIG. 4 is a schematic diagram of the sector 40 received by the C1 encoder 36 shown in FIG. 2. Since the unequal-length delay lines 34 shown in FIG. 2 delay the symbols inputted at the same time by different time intervals, the length of the sector 40 shown in FIG. 3 is extended from 98 frames to 206 frames as shown in FIG. 4. Referring FIG. 4, a symbol 42 of the sector 40 will be recorded onto the CD with twenty-seven symbols of other sectors in a frame, and the symbols 44, 46 of sector 40 will be recorded on to the CD with twenty-six symbols of other sectors in a frame. If a defect exists in the region for recording the first frame of the sector 40, only symbol 42 is impacted by the defect. However, if a defect exists in the region for recording the fifth frame of the sector 40, two symbols 44, 46 are impacted by the defect.

It is clear that the impacts of the different defects, even those that have the same size but are in different locations, are different. As a result, the defect estimation value generated by the defect estimating apparatus of the related art cannot precisely represent the corresponding impact of a defect.

SUMMARY

It is therefore an objective of the claimed invention to provide a defect estimating apparatus and a related method capable of responding precisely to the impact of a defect.

According to the claimed invention, a weighted defect estimating apparatus for determining a defect estimation value is disclosed. The weighted defect detecting apparatus comprises: a defect detecting unit for generating a defect value when a defect in a predetermined region of an optical disc is detected; a weighting circuit, electrically connected to the defect detecting unit, to generate a weighted defect value according to the defect value and a weighting factor corresponding to a location of the defect on the optical disc; and a computing module, electrically connected to the weighting circuit, for computing the defect estimation value according to a plurality of weighted defect values corresponding to the predetermined region.

According to the claimed invention, a weighted defect estimating apparatus is disclosed. The weighted defect estimating apparatus comprises: a defect detecting unit for generating a defect value when a defect in a predetermined region of an optical disc is detected; and a plurality of defect estimation circuits for generating a plurality of defect estimation values corresponding to a plurality of sectors recorded onto the optical disc at the same time. Each defect estimation circuit comprises: a weighting circuit, electrically connected to the defect detecting unit, for generating a weighted defect value according to the defect value and a weighting factor corresponding to a location of the defect on the optical disc; and a computing module, electrically connected to the weighting circuit, for computing a defect estimation value according to a plurality of weighted defect values corresponding to the predetermined region.

According to the claimed invention, a weighted defect estimating method for determining a defect estimation value utilized for estimating quality of a recording area on an optical disc, the weighted defect detecting method comprises: generating a defect value when a defect on the optical disc is detected; adjusting the defect value according to a weighting factor to generate a weighted defect value; and computing the defect estimation value according to a plurality of weighted defect values corresponding to the recording area.

The weighted defect estimating apparatus utilizes a weighting circuit to generate a weighted defect value. Firstly, the weighting circuit determines the location of the defect when the defect is detected. Next, the weighting circuit determines a weighting factor according to the location of the defect. Next, the weighting circuit generates the weighted defect value by adjusting the defect value transmitted from the detecting unit according to the weighting factor.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
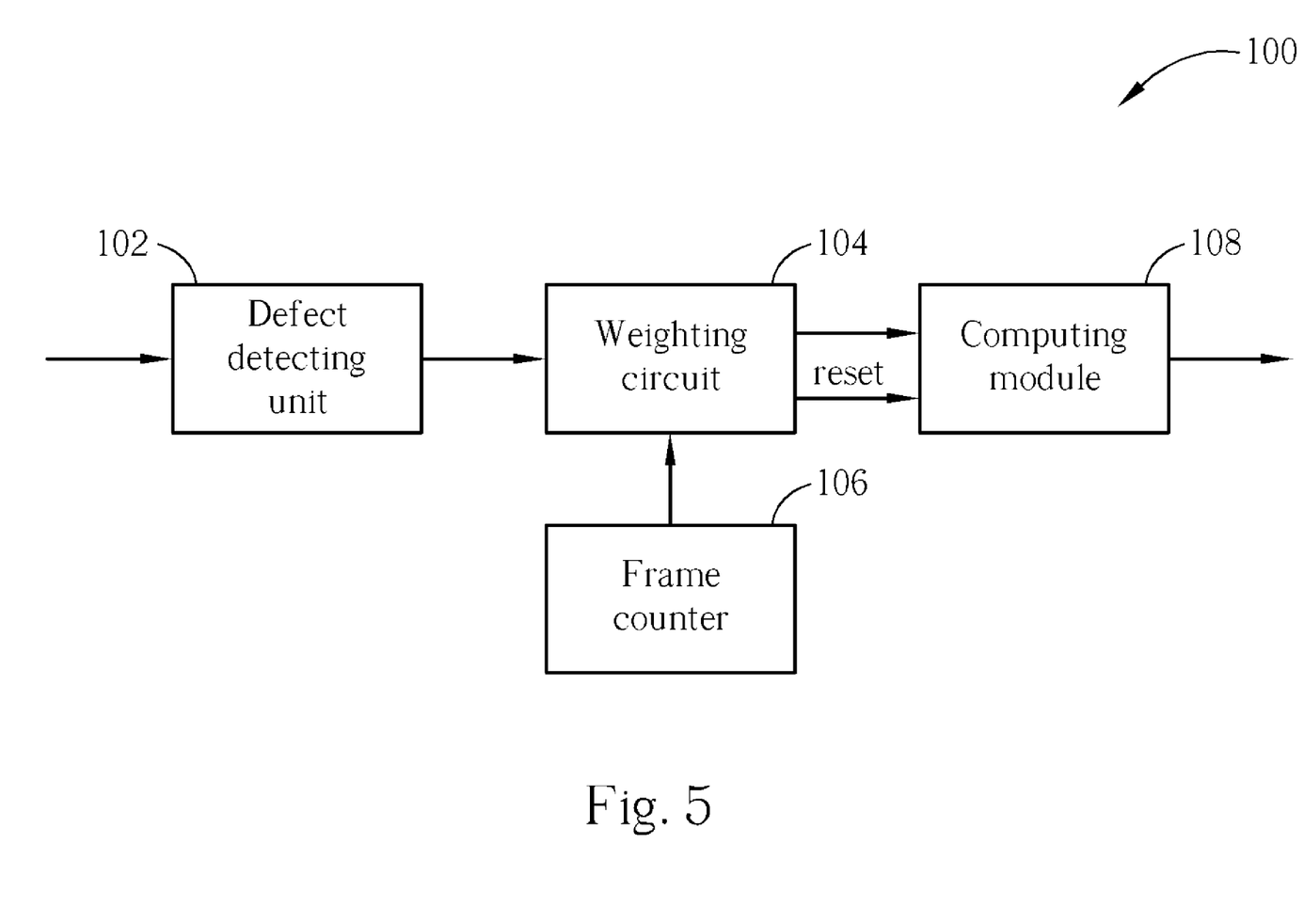
FIG. 5 is a functional block diagram of the defect estimating apparatus according a preferred embodiment of the present invention.

Please refer to FIG. 5. FIG. 5 is a functional block diagram of a weighted defect estimating apparatus 100 applied in an optical disc drive according a preferred embodiment of the present invention. The weighted defect estimating apparatus 100 comprises a defect detecting unit 102, a weighting circuit 104, a computing module 108, and a frame counter 106. When the optical disc drive starts to record a target sector into a predetermined region, the defect detecting unit 102 continues to detect if there exists a defect in a predetermined region being utilized for recording the target sector. The frame counter 106 counts a plurality of frames of the target sector to be written on the predetermined region, and outputs a frame number to the weighting circuit 104 accordingly. When a defect is detected in the predetermined region, the counting result just outputted by the frame counter denotes a logical location of the defect. The defect detecting unit 102 outputs a defect value to the weighting circuit 104. Next, the weighting circuit 104 generates a weighted defect value by adjusting the defect value according to a weighting factor. The value of the weighting factor corresponds to the location of the defect detected on the optical disc. The detail description of determining the value of the weighting factor is included in the following paragraphs. In the present embodiment, the computing module 108 is an accumulating unit utilized for accumulating the received weighted defect values to generate a defect estimation value. If the defect estimation value is greater than a threshold value, the optical disc drive will skip the predetermined region in favor of recording data into another region. In addition, if the weighting circuit 104 receives a frame number corresponding to the end of the predetermined region, the weighting circuit 104 transmits a reset command to the computing module 108. Then, the computing module 108 will set the defect estimation value to be zero after receiving the reset command.

Figure 6:
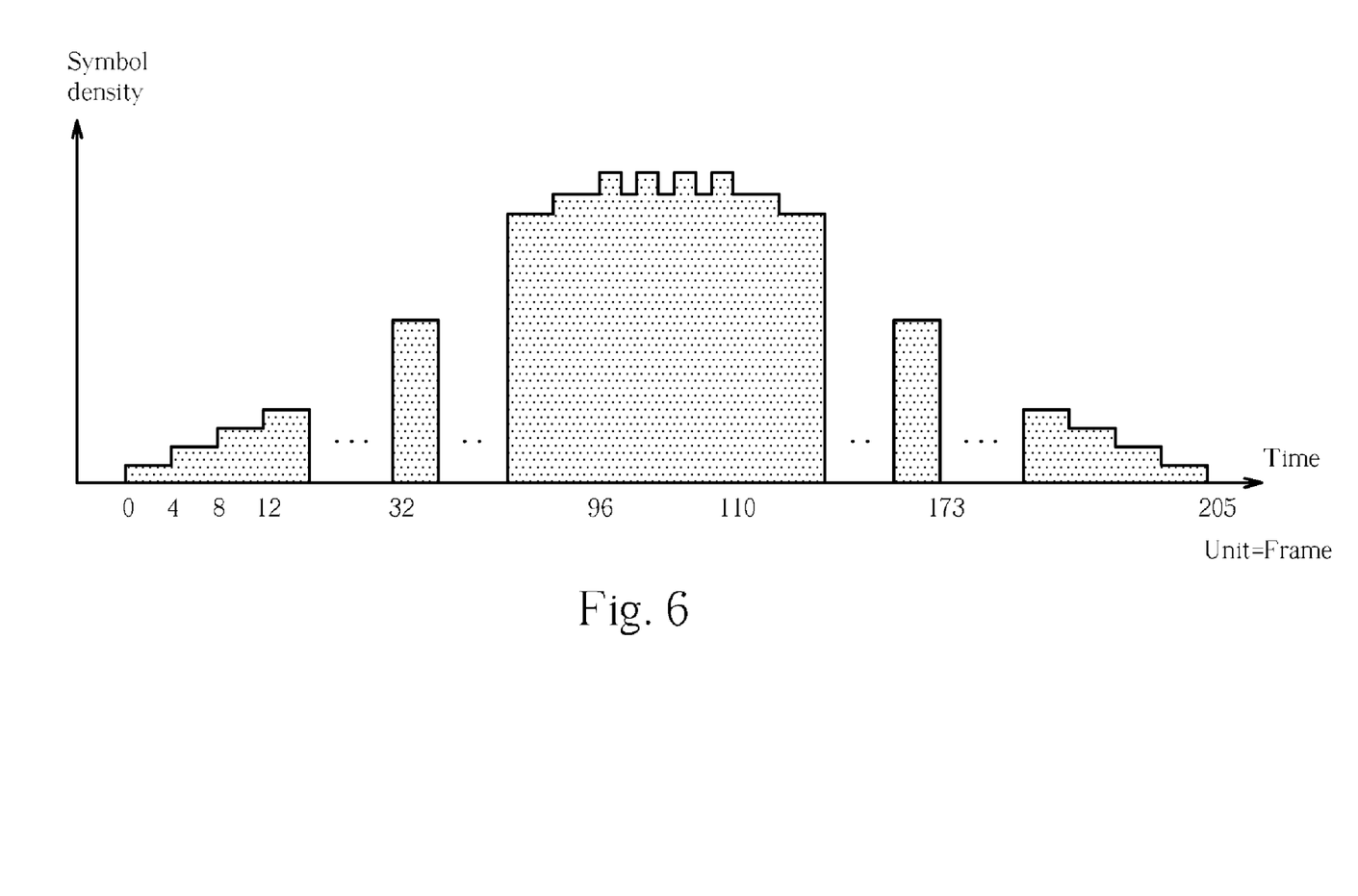
FIG. 6 is a schematic diagram of the symbol density of the sector shown in FIG. 4.

Please refer to FIG. 6. FIG. 6 is a schematic diagram of the symbol density of the target sector 40 shown in FIG. 4. As shown in FIG. 6, the symbol density of the target sector 40 varies with time. In the FIG. 6, the time index is represented by the frame number generated by the frame counter 106 shown in FIG. 5. As the symbol density increases, the effect caused by a defect to the sector 40 increases. Owing to the phenomenon mentioned above, the present invention is capable of determining the value of the weighting factor according to the symbol density corresponding to the defect detected. Since the distribution of the symbol density of every sector is the same, the present invention is also capable of determining the value of the weighting factor according to the location of the defect in a sector.

For describing the operation of the weighting circuit 104, please refer to FIG. 5 again. As mentioned above, the weighting circuit 104 determines the value of the weighting factor according to the location of the defect detected by the defect detecting unit 102. When a defect value is transmitted to the weighting circuit 104, the frame number N just received by the weighting circuit 104 denotes the location of the defect. According to the present embodiment, if the frame number N is greater than zero and smaller than 34, the value of the weighting factor is "1"; if the frame number N is greater than 33 and smaller than 68, the value of the weighting factor is "2"; if the frame number N is greater than 67 and smaller than 137, the value of the weighting factor is "3"; if the frame number N is greater than 136 and smaller than 171, the value of the weighting factor is "2"; if the frame number N is greater than 170 and smaller than 205, the value of the weighting factor is "1"; otherwise, the value of the generated weighting factor is "0". It should be noted that the method of determining the value of the weighting factor is not limited to the preferred embodiment. Any methods capable of determining the value of the weighting factor according to the location of the defect can be applied in the present invention.

Figure 7:
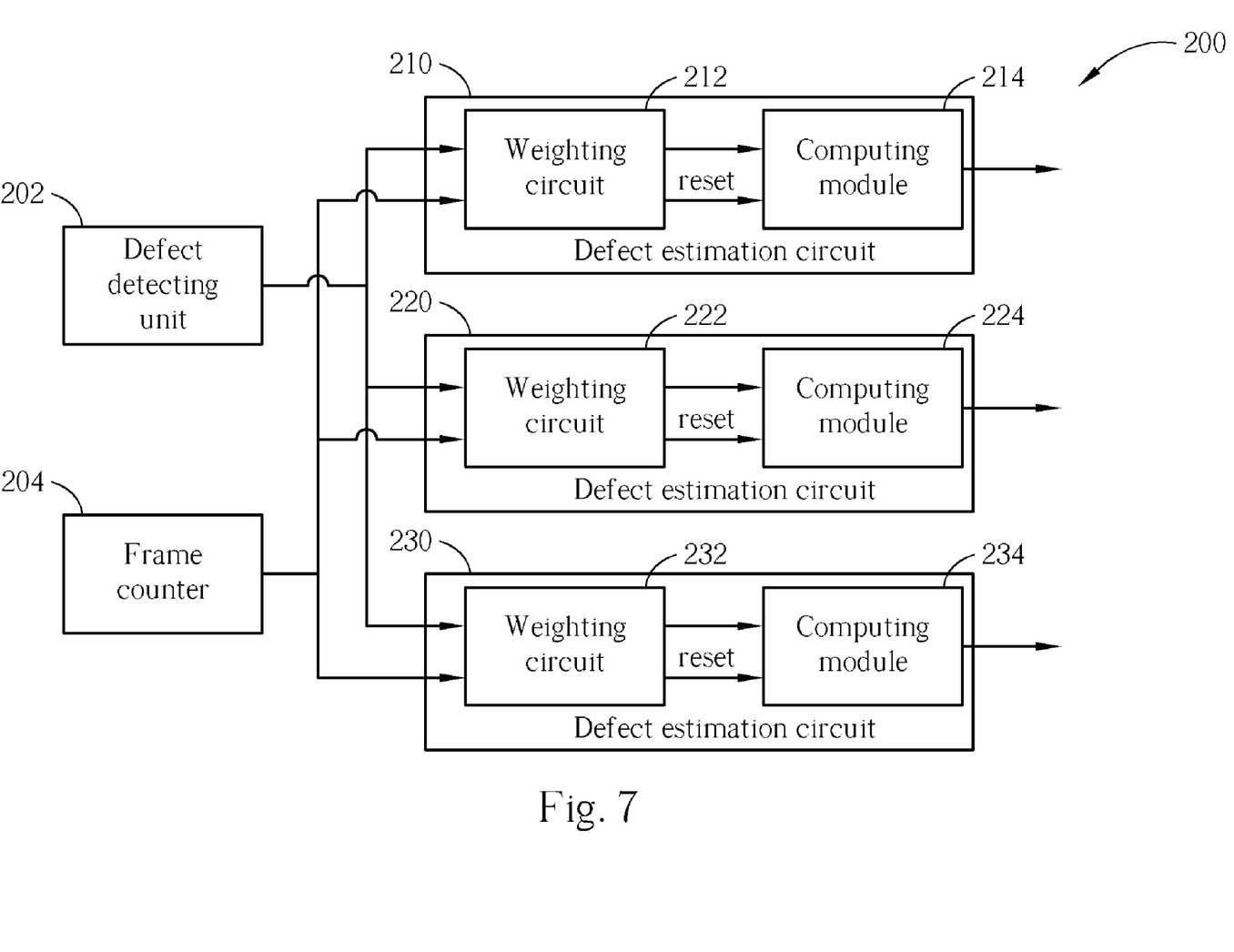
FIG. 7 is a schematic diagram of the weighted defect estimating apparatus.

Owing to the characteristics of the CD encoder, there is more than one sector to be recorded onto the optical disc at the same time. Therefore, a plurality of devices utilized for determining the defect estimation values of each of the sectors are provided according to the present invention. Please refer to FIG. 7. FIG. 7 is a schematic diagram of the weighted defect estimating apparatus 200. As shown in FIG. 7, the weighted defect estimating apparatus 200 comprises a defect detecting unit 202, a frame counter 204, and a plurality of defect estimation circuits 210, 220, 230. The defect estimation circuit 210 comprises a weighting circuit 212 and a computing module 214; the defect estimation circuit 220 comprises a weighting circuit 222 and a computing module 224; and the defect estimation circuit 230 comprises a weighting circuit 232 and a computing module 234. Since the operation of the weighting circuits 212, 222, 232, and the computing modules 214, 224, 234 are the same with the devices having the same name in FIG. 5, a detail description is omitted for the sake of brevity. It should be noted that each weighting circuit determines the weighting factor according to the symbol density of the corresponding sector. Since the symbol density of the plurality sectors are not synchronous, the values of the weighting factors are not synchronous.

Figure 8:
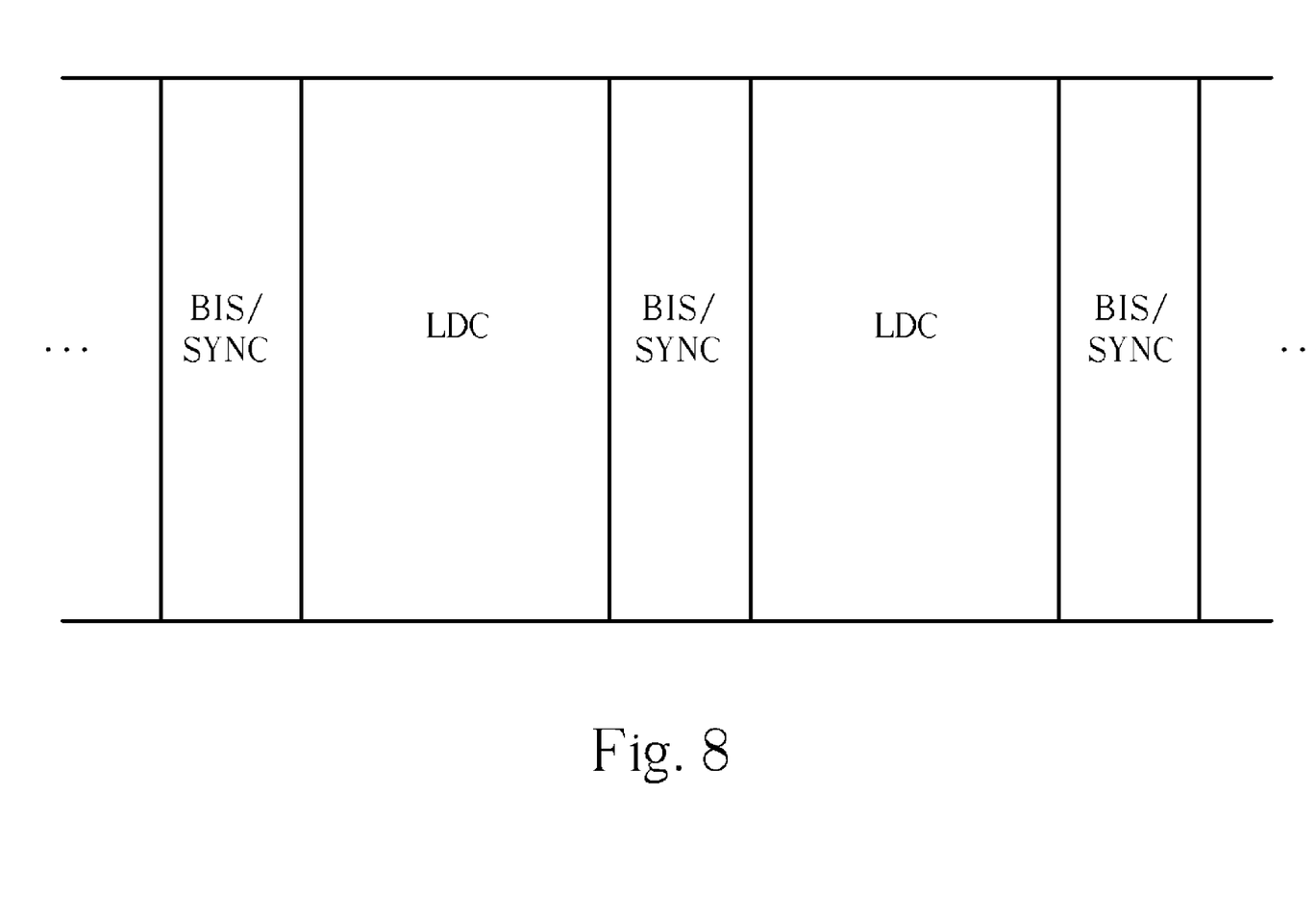
FIG. 8 is a schematic diagram of the physical cluster of the BD.

According to the present invention, the weighted defect estimating apparatus can be applied in other optical discs, not limited to the CD. Take the Blu-ray Disc (BD) as an example. Please refer to FIG. 8. FIG. 8 is a schematic diagram of the physical cluster of the BD. The physical cluster of the BD comprises a plurality of BIS/SYNC areas and a plurality of Long Distance Code (LDC) areas. The LDC areas are utilized for recording the data stream to be written onto the disc. The BIS/SYNC areas are utilized for recording the bispectral index of the data stream to be written onto the disc. If there is a defect in a BIS/SYNC area, the data stream recorded in the following LDC area may be marked erasure. As a result, the values of the weighting factors corresponding to the BIS/SYNC areas are greater than the values of the weighting factors corresponding to the LDC areas. It should be noted that if the weighted defect estimating apparatus 100 is applied to a BD drive, the frame counter 106 shown in FIG. 5 should be replace by a channel bit counter, since the resolution of the frame counter 106 is not small enough to distinguish the BIS/SYNC area and LDC area. As a result, the logical location of the defect is represented by channel bits. Additionally, the storage area of a DVD is also divided into sync areas and data areas similar to the storage area of a BD. Therefore, the values of the weighting factors corresponding to the sync areas on a DVD are greater than the values of the weighting factors corresponding to the data areas on a DVD.

Compared with the related art, the weighted defect estimating apparatus is capable of adjusting the defect value with a weighting factor to emphasize or alleviate the defect value. Therefore, the defect estimation value generated by the weighted defect estimating apparatus represents the effect of a defect more precisely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A weighted defect estimating apparatus for determining a defect estimation value, the weighted defect estimating apparatus comprising:
   a defect detecting unit for generating a defect value when a defect in a predetermined region of an optical disc is detected;
   a weighting circuit, electrically connected to the defect detecting unit, to generate a weighted defect value according to the defect value and a weighting factor corresponding to a location of the defect on the optical disc; and
   a computing module, electrically connected to the weighting circuit, for outputting the defect estimation value according to a plurality of weighted defect values corresponding to the predetermined region.

2. The weighted defect estimating apparatus of claim 1, wherein the location of the defect on the optical disc relates to a logical location.

3. The weighted defect estimating apparatus of claim 1, wherein the computing module comprises:
   an accumulating unit for accumulating the weighted defect values to generate the defect estimation value.

4. The weighted defect estimating apparatus of claim 1, further comprising:
   a counter for counting data to be written on the optical disc to generate a counting result;
   wherein when the weighting circuit receives the defect value, the weighting circuit determines the location of the defect according to the counting result outputted by the counter then determines the value of the weighting factor for the defect value according to the counting result.

5. The weighted defect estimating apparatus of claim 4, wherein the counter is a frame counter, electrically connected to the weighting circuit, for counting a plurality of frames to be written on the optical disc and the counting result is a frame number.

6. The weighted defect estimating apparatus of claim 5, wherein if a first frame number falls in a first range, the weighting circuit assigns a first value to a weighting factor corresponding to the first frame number, and if a second frame number falls in a second range, the weighting circuit assigns a second value to a weighting factor corresponding to the second frame number.

7. The weighted defect estimating apparatus of claim 5, wherein the optical disc is a Compact Disc (CD).

8. The weighted defect estimating apparatus of claim 4, wherein the counter is a channel bit counter, electrically connected to the weighting circuit, for counting a plurality of channel bits to be written on the optical disc and the counting result is a channel bit number.

9. The weighted defect estimating apparatus of claim 8, wherein the optical disc is a Blu-ray Disc (BD).

10. The weighted defect estimating apparatus of claim 8, wherein the optical disc is a Digital Versatile Disc (DVD).

11. A weighted defect estimating apparatus comprising:
    a defect detecting unit for generating a defect value when a defect in a predetermined region of an optical disc is detected; and
    a plurality of defect estimation circuits for generating a plurality of defect estimation values corresponding to a plurality of sectors recorded on the optical disc at the same time;
    wherein each defect estimation circuit comprises:
    a weighting circuit, electrically connected to the defect detecting unit, for generating a weighted defect value according to the defect value and a weighting factor corresponding to a location of the defect on the optical disc; and
    a computing module, electrically connected to the weighting circuit, for computing a defect estimation value according to a plurality of weighted defect values corresponding to the predetermined region.

12. A weighted defect estimating method for determining a defect estimation value utilized for estimating quality of a recording area on an optical disc, the weighted defect detecting method comprising:
    generating a defect value when a defect on the optical disc is detected;
    adjusting the defect value according to a weighting factor to generate a weighted defect value; and
    computing the defect estimation value according to a plurality of weighted defect values corresponding to the recording area.

13. The weighted defect estimating method of claim 12, wherein the location of the defect on the optical disc relates to a logical location.

14. The weighted defect estimating method of claim 12, wherein the step of computing the defect estimation value comprises:
    generating the defect estimation value by accumulating the weighted defect values.

15. The weighted defect estimating method of claim 12, further comprising:
    counting data to be written on the optical disc to generate a counting result;
    wherein the weighting factor is determined for the defect value according to the counting result corresponding to the defect.

16. The weighted defect estimating method of claim 15, wherein the step of counting data to be written on the optical disc comprises:

counting a plurality of frames to be written on the optical disc to generate a frame number corresponding to the counting result.

17. The weighted defect estimating method of claim 16, wherein if a first frame number falls in a range, a specific value is assigned to a weighting factor corresponding to the first frame number, and if a second frame number falls in the same range, the same specific value is assigned to a weighting factor corresponding to the second frame number.

18. The weighted defect estimating method of claim 16, wherein the optical disc is a Compact Disc (CD).

19. The weighted defect estimating method of claim 15, wherein the step of counting data to be written on the optical disc comprises:

counting a plurality of channel bits to be written on the optical disc to generate a channel bit number corresponding to the counting result.

20. The weighted defect estimating method of claim 19, wherein the optical disc is a Blu-ray Disc (BD).

21. The weighted defect estimating apparatus of claim 19, wherein the optical disc is a Digital Versatile Disc (DVD).

* * * * *